United States Patent Office 2,791,580
Patented May 7, 1957

2,791,580
RED DISAZO DYESTUFF

Hans Krzikalla, Heidelberg, Germany, assignor to Badische Anilin- & Soda-Fabrik Aktiengesellschaft, Ludwigshafen (Rhine), Germany Application July 26, 1954, Serial No. 445,936

1 Claim. (Cl. 260—179)

This invention relates to a new and valuable disazo dyestuff.

I have found that a very valuable red disazo dyestuff which is especially suitable for dyeing leather is obtained by coupling 1 molecule of tetrazotized 4.4'-diamino-2.2'-dimethyldiphenylmethane with one molecule each of 2-hydroxynaphthalene-6-sulphonic acid and 2-hydroxynaphthalene-3.6-disulphonic acid.

Strikingly in contrast to the corresponding disazo dyestuffs which contain 2 molecules of 2-hydroxynapthalene-6-sulphonic acid or 2 molecules of 2-hydroxynaphthalene-3.6-disulphonic acid on both sides of the tetrazo compound, the new unsymmetric disazo dyestuff has a very good solubility in water and yields on leather a brilliant brick-red full surface colour which renders it especially valuable.

The following example will further illustrate this invention but the invention is not limited to this example. The parts are parts by weight.

*Example*

113 parts of 4.4'-diamino-2.2'-dimethyldiphenylmethane are tetrazotized in the usual manner in about 1000 parts of water and 250 parts of hydrochloric acid (M=100). The tetrazo solution is allowed to flow rapidly while stirring into a cooled solution of 123 parts of the sodium salt of 2-hydroxynaphthalene-6-sulphonic acid, 159 parts of sodium carbonate and about 2000 parts of water. The intermediate coupling is complete after about 30 minutes. A solution of 174 parts of the sodium salt of 2-hydroxynaphthalene-3.6-disulphonic acid in about 1500 parts of water is then added. After stirring overnight, the new disazo dyestuff is salted out with sodium chloride, filtered off by suction and dried. The yield is 452 parts. The dyestuff has a very good solubility in water and dyes chrome leather full, brilliant red shades.

What I claim is:

The disazo dyestuff of the formula

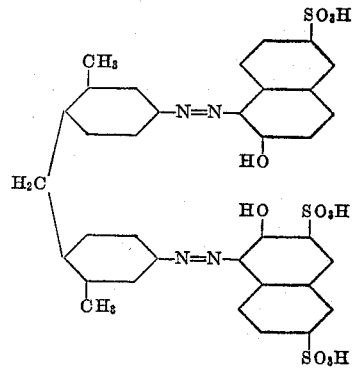

References Cited in the file of this patent

UNITED STATES PATENTS 1,233,742    Anderwert et al. _____ July 17, 1917

FOREIGN PATENTS 43,644      Germany _____ May 29, 1888
154,036     Switzerland _____ July 1, 1932